(12) United States Patent
Love et al.

(10) Patent No.: US 7,653,245 B2
(45) Date of Patent: Jan. 26, 2010

(54) SYSTEM AND METHOD FOR CODING AND RETRIEVAL OF A CAD DRAWING FROM A DATABASE

(75) Inventors: Douglas Love, Lichfield (GB); Jeffrey Barton, Sheffield (GB)

(73) Assignee: Aston University, Birmingham (GB)

( * ) Notice: Subject to any disclaimer, the term of this patent is extended or adjusted under 35 U.S.C. 154(b) by 985 days.

(21) Appl. No.: 10/734,613

(22) Filed: Dec. 12, 2003

(65) Prior Publication Data

US 2004/0177089 A1 Sep. 9, 2004

(30) Foreign Application Priority Data

Dec. 12, 2002 (GB) ................................. 0228973.4

(51) Int. Cl.
- *G06K 9/66* (2006.01)
- *G06T 15/10* (2006.01)
- *G06T 15/20* (2006.01)
- *G06F 3/048* (2006.01)

(52) U.S. Cl. ....................... 382/190; 382/195; 345/427; 715/849

(58) Field of Classification Search ................. 382/195, 382/131, 236, 190; 703/103; 345/427; 715/849
See application file for complete search history.

(56) References Cited

U.S. PATENT DOCUMENTS

| | | | | |
|---|---|---|---|---|
| 5,390,199 A | * | 2/1995 | Ajima et al. | 714/819 |
| 5,583,975 A | * | 12/1996 | Naka et al. | 345/426 |
| 6,256,417 B1 | * | 7/2001 | Takahashi et al. | 382/232 |
| 6,918,092 B2 | * | 7/2005 | Talley et al. | 715/769 |
| 6,918,095 B1 | * | 7/2005 | Agnes et al. | 715/849 |
| 6,954,549 B2 | * | 10/2005 | Kraft | 382/167 |
| 2001/0036322 A1 | * | 11/2001 | Bloomfield et al. | 382/276 |
| 2001/0043236 A1 | * | 11/2001 | Yamamoto | 345/781 |
| 2003/0149780 A1 | * | 8/2003 | Inoue et al. | 709/229 |
| 2004/0049307 A1 | * | 3/2004 | Beatty et al. | 700/97 |

\* cited by examiner

*Primary Examiner*—John B Strege
(74) *Attorney, Agent, or Firm*—Arent Fox LLP; Michael Fainberg

(57) ABSTRACT

A method of coding a view in a CAD drawing comprises: identifying a feature of the view; extracting properties of the feature from the CAD drawing, the properties including vector properties associated with a graphic entity or group of entities which make up the feature; generating code bits representative of the extracted properties; adding the code bits to a view code for the view; and storing the view code.

A CAD drawing is selected for retrieval from a database of drawings by producing a CAD source drawing having a source view, coding the source view to produce a source code as described above, comparing the source code with stored view codes, calculating a similarity index for each stored view code and selecting the drawing for retrieval from the database on the basis of the similarity index.

52 Claims, 11 Drawing Sheets

| Part 1 code = | 1 | 0 | 1 | 0 | 1 | 0 | |
|---|---|---|---|---|---|---|---|

| Part 2 code = | 1 | 1 | 1 | 0 | 0 | 0 | |
|---|---|---|---|---|---|---|---|

| Part 3 code = | 1 | 0 | 1 | 0 | 1 | 1 | |
|---|---|---|---|---|---|---|---|

SYSTEM AND METHOD FOR CODING AND RETRIEVAL OF A CAD DRAWING FROM A DATABASE

TECHNICAL FILED

The present invention relates to a method for coding a CAD drawing and to a system and method for selecting a coded CAD drawing for retrieval from a stored database of drawings.

BACKROUND OF THE INVENTION

In designing new products, the designer or engineer can help to reduce costs by being able to retrieve drawings of existing components from a database of drawings in a Computer Aided Design (CAD) system. This can help to prevent unnecessary duplication of component designs or save time by adapting designs of existing components. The effectiveness of a retrieval system depends on its ability to search a large number of drawings of components so as to identify a drawing or drawings of one or more similar components.

Retrieval systems based on text descriptions or keywords are known but these are unreliable since the descriptions of parts are often based on their function rather than their geometry. Also, keywords and phrases can be ambiguous when used as part descriptors, for example "washer" and "spacer" could both be used as descriptors for the same item. The setting up and maintenance of a keyword database is time consuming and requires manual input. The effort and disciplines required are high if the system is not to fall into disuse.

Part numbering systems are also known, but these are primarily used to provide unique component identification, and are very limited with regard to automated search capabilities.

Coding and classification systems are known, where a database is created, which contains codes representative of the geometrical and engineering features of each drawing. Again the setting up and maintenance of these systems require considerable time, effort and discipline.

Bit-mapped image systems are known in which a computer program analyses an image and extracts a variety of information (usually colour, texture and shape). The information is processed and stored in a database. One problem with bit-mapped systems is that they rely on what is essentially arbitrary image data. The data is arbitrary in the sense that it relates only to the individual bits of the bit-mapped image, and is not directly associated with properties of the geometrical features which characterise the drawing.

Another problem arises when a drawing comprises more than one view. For example, an engineering drawing of a component may include separate views of different elevations, sectional views or views showing parts of the component in greater detail. Identification of separate views in a drawing represented by a bit-map is difficult because bit-map systems rely on pattern recognition.

Pixel-based systems are also known, but these suffer from similar problems to bit-map systems.

SUMMARY OF THE INVENTION

It is an aim of the present invention to provide a method of coding a CAD drawing and a system for operating the method which alleviate these problems.

According to a first aspect of the present invention, there is provided a method of coding a view in a CAD drawing, the method comprising:

a) identifying a feature of the view, wherein the feature comprises a graphic entity or a group of graphic entities;

b) extracting properties of the feature from the CAD drawing, wherein the properties include vector properties associated with the entity or group of entities;

c) generating code bits representative of the extracted properties;

d) adding the code bits to a view code for the view; and e) storing the view code.

Preferably, the method includes repeating steps a) to d) for further features in the view.

The term "code bits" as used herein is intended to refer to any element of a code which is used in a coding system to represent an item or property value of an object which is being coded. Thus, a code bit may be a bit (binary digit) in a digital code as used, for example, in a preferred embodiment, or it may be some other element such as a numeric or alphabetic character, depending on the particular coding system employed.

It is an advantage that the method uses properties associated with the geometrical features that make up the view, rather than arbitrary bit-map or pixel image data. The method is a fast and efficient way of producing a coded representation of the geometrical features that characterise the view.

CAD drawings are vector-based. The data required for the CAD system to generate a drawing for display to the user is digital data representing the vector properties of drawing entities (lines, arcs, circles etc.). The vector properties may include coordinate data for specifying the location of an entity, as well as data for defining the geometry of an entity, such as line length, orientation, radius etc. Processing a vector-based image as a bit-map or pixel image is inappropriate because the vector data is ignored, and is inefficient because a much greater quantity of data is required to define an entity in a bit-map.

The geometrical features may include a group of entities having similar properties, a group of entities of a similar type (e.g. lines or circles) or entities that form a group by virtue of their location or juxtaposition in the view. It is an advantage that the method of coding does not require coding of every individual entity in the view. This improves the efficiency of the method and requires less memory capacity for storing the view code.

In a preferred embodiment, the method further includes identifying the views in a drawing for coding. Preferably, identifying the views comprises defining a boundary enclosing an area which includes the entities in the drawing and dividing the area to define a plurality of view areas, such that each view area includes one or more entities, and no entity is included in more than one area.

Thus, having identified the views to be coded, the method can readily code each of the views in the drawing to provide a complete set of coded views for the drawing.

Preferably, the boundary is a bounding rectangle, the step of dividing the boundary to define a plurality of view areas comprising splitting the bounding rectangle to define a plurality of view rectangles.

More preferably, the method further includes the step of refining the views to be coded by removing all views having less than a predetermined number of entities and passing for coding views having greater than or equal to the predetermined number of entities. This means that views which are small or insignificant can be filtered out of the coding process.

In a preferred embodiment, the step of extracting the properties comprises identifying a type for each property from a predefined plurality of property types, each property type having associated items of property data, extracting the property data from the CAD drawing and writing the type and associated property data items to a list.

Preferably, the step of generating code bits includes setting type code bits corresponding to the property type and setting data code bits corresponding to each item of property data.

More preferably, the setting of data code bits includes comparing each property data item with a predetermined sub-set of data associated with a given code bit and setting the given data code bit if the property data item falls within the predetermined sub-set.

This means that where it is possible for a property data item to have one of a large number of possible values, the data is quantised so that a relatively small number of data code bits can be used as codes for representing an entity.

In a preferred embodiment the code has a defined structure of code bits. The drawing may have a predetermined class, the code structure being defined differently for drawings having different classes. It is an advantage that this allows a code structure to be used which is most appropriate for the class of drawing. For example, one code structure may be more efficient or appropriate for use with a class of drawing that includes electrical wiring diagrams whereas another code structure is more appropriate for drawings of mechanical components.

Preferably, each code bit has an associated attribute, a method for comparing the property data item with the predetermined sub-set of data associated with the code bit being determined by the attribute. This means that an appropriate comparison method is applied for the code bit being set.

More preferably, the attribute associated with the code bit is a predetermined attribute selected from a list of attributes which includes range, numeric and text, having respective associated comparison methods of:

"within range" wherein the code bit is set when the property data item has a value that falls within a predetermined range;

"greater than, less than, equal" wherein a different code bit is set according to whether the property data item has a value greater than, less than or equal to a predetermined value; and "substring" wherein the code bit is set if there is exact correspondence with a predetermined text substring.

In a preferred embodiment the step of storing the view code includes encrypting the view code and storing the encrypted view code. Encrypting provides a secure and effective method for storing data codes.

Preferably the step of storing comprises storing the encrypted view code in a catalogue, the catalogue being a portion of the database in which a sub-set of drawings is stored. The sub-set of drawings may be drawings of similar or related components, thereby facilitating subsequent search and retrieval of a drawing.

More preferably, the step of storing includes storing encrypted view codes of all views in a drawing. The step of storing may further include storing an image file of the drawing and/or other information relating to the drawing. The other information may include details of a part or component depicted by the drawing.

In a preferred embodiment, the method includes, prior to extracting the vector properties, a filter process for temporarily removing extraneous material from the drawing. In order to provide a code which reliably characterises the features of a view, it is important that extraneous material that may appear on the drawing is removed before the view is coded.

Preferably, the filter process includes temporarily removing a frame/border of the drawing. The frame/border may be temporarily removed by identifying line entities which make up the frame/border, identifying an inner boundary of the frame/border line entities, and temporarily deleting all entities outside the inner boundary.

Alternatively, or additionally the filter process includes temporarily removing other entities. The other entities may include any one or more of: dimensions, machining marks, lines of prescribed type or name or colour, drawing layers of prescribed name, text with prescribed colour, and blocks.

According to a second aspect of the present invention there is provided a method of selecting a CAD drawing for retrieval from a database of drawings, the method comprising:

a) producing a CAD source drawing comprising a source view;

b) coding said source view according to the method of the first aspect to produce a source code of the source view;

c) comparing the source code with each of a plurality of stored view codes and calculating a similarity index for each stored view code of the plurality, wherein the stored view codes are codes produced according to the method of the first aspect of a plurality of views in drawings in the database and the similarity index is indicative of a degree of similarity between the view and the source view; and d) selecting the drawing for retrieval from the database on the basis of the similarity index.

In a preferred embodiment, the step of selecting comprises identifying a most similar view of the plurality of views, the most similar view having the highest similarity index, and selecting the drawing which contains the most similar view.

Preferably the step of selecting includes the step of displaying a list of drawings for user selection of the drawing, the list being ordered according to the similarity indices of views in the drawings.

An advantage is that, once the source drawing has been coded and the source code compared with each of the plurality of stored view codes, no further comparison or searching is required. The user can simply scan down the list, starting with the drawing containing the most similar view, to find the required drawing.

Preferably, the plurality of stored view codes comprises the view codes of views contained in drawings stored in a catalogue, the catalogue being a portion of the database.

This means that when the user knows that the required drawing is of a certain type, or relates to a certain subset of drawings (e.g. relates to a certain type of component), then only the view codes of views in the subset of drawings need to be compared with the source view code.

According to a third aspect of the present invention there is provided a drawing retrieval system for a CAD system comprising means for entering and means for displaying a drawing, and a memory for storing data including a database of drawings, the drawing retrieval system comprising:

a) identifying means for identifying a feature of a view in a drawing, wherein the feature comprises a graphic entity or a group of graphic entities;

b) means for extracting properties of the feature, wherein the properties include vector properties associated with the entity or group of entities;

c) coding means for generating code bits representative of the extracted properties and for adding the code bits to a view code for the view;

d) means for storing the view code in the memory;

e) comparing means for comparing (i) a first view code of a first view in a first drawing entered in the entering means with (ii) a second view code of a second view in a second drawing in the database, to derive a similarity index indicative of a degree of similarity between the first view and the second view; and f) means for selecting the second drawing for retrieval from the database for display on the display means on the basis of the similarity index.

The system allows the designer to enter a drawing or sketch of a required component. The system performs a comparison of the view code for the sketch with the view codes of one or more drawings in the database and determines a similarity index for each view compared. The user can then select the most similar view, or another view from a list of views in order of similarity, and display the drawing containing the selected view.

According to a fourth aspect of the present invention there is provided a software carrier comprising computer readable instructions for controlling a computer to perform the method according to the first or second aspect.

The term "software carrier" as used herein includes a computer readable disk, diskette or CD, or a data signal derived therefrom and transmitted by cable, wire or wireless means.

BRIEF DESCRIPTION OF THE DRAWINGS

Embodiments of the invention will now be described by way of example with reference to the following drawings:

FIG. 11 shows an example of parts view codes for use with the method of the embodiment of FIG. 8.

DETAILED DESCRIPTION OF EMBODIMENTS

Figure 1:
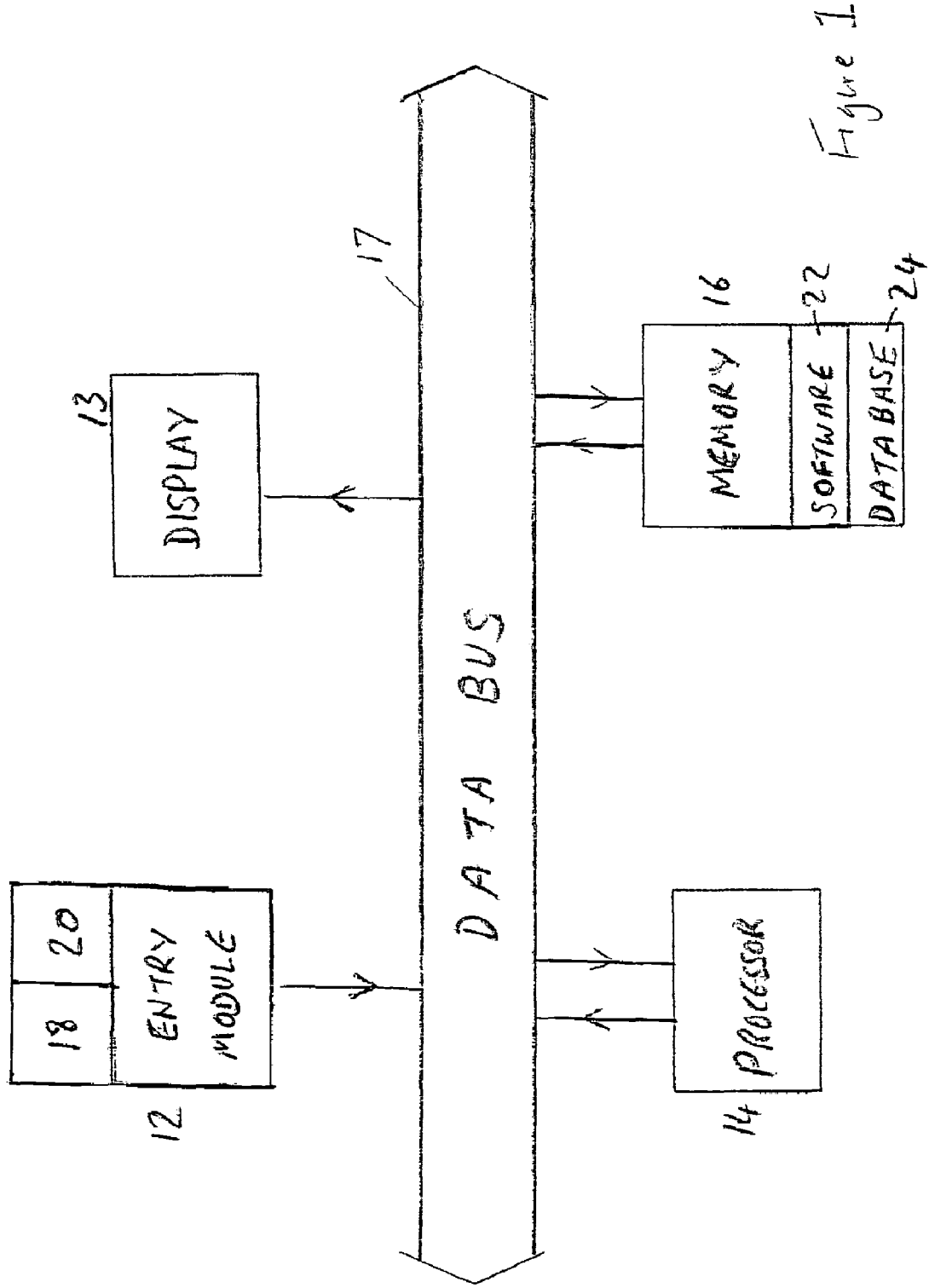
FIG. 1 is a schematic diagram of a known CAD system.

Referring to FIG. 1, a CAD system 10 comprises a drawing entry module 12, a display 13, a processor 14, a memory 16, and a databus 17. The drawing entry module has user inputs 18, 20, including at least a mouse and a keyboard, but which may also include a digitiser tablet and/or a scanner. The user operates inputs 18, 20 to enter drawing data. The memory 16 stores data including operating software 22 and a database 24 of CAD drawings. The processor 14 operates to control the display and to process data in accordance with program instructions in the software or in response to user input data. Data is transferred by way of the databus 17.

When a designer wishes to create a new design, a great deal of time and effort can be saved by making use of existing components, for which design drawings already exist in the database 24. However, this saving will only be optimal if minimal time and effort are involved in searching for the existing design. For this to be the case, firstly an efficient way of storing information about each drawing in the database 24 is required. Secondly, the information about the drawing needs to be in a form which facilitates a quick and efficient comparison so that the search can identify the drawing(s) in the database of the component(s) most similar to the required component.

Figure 9A:
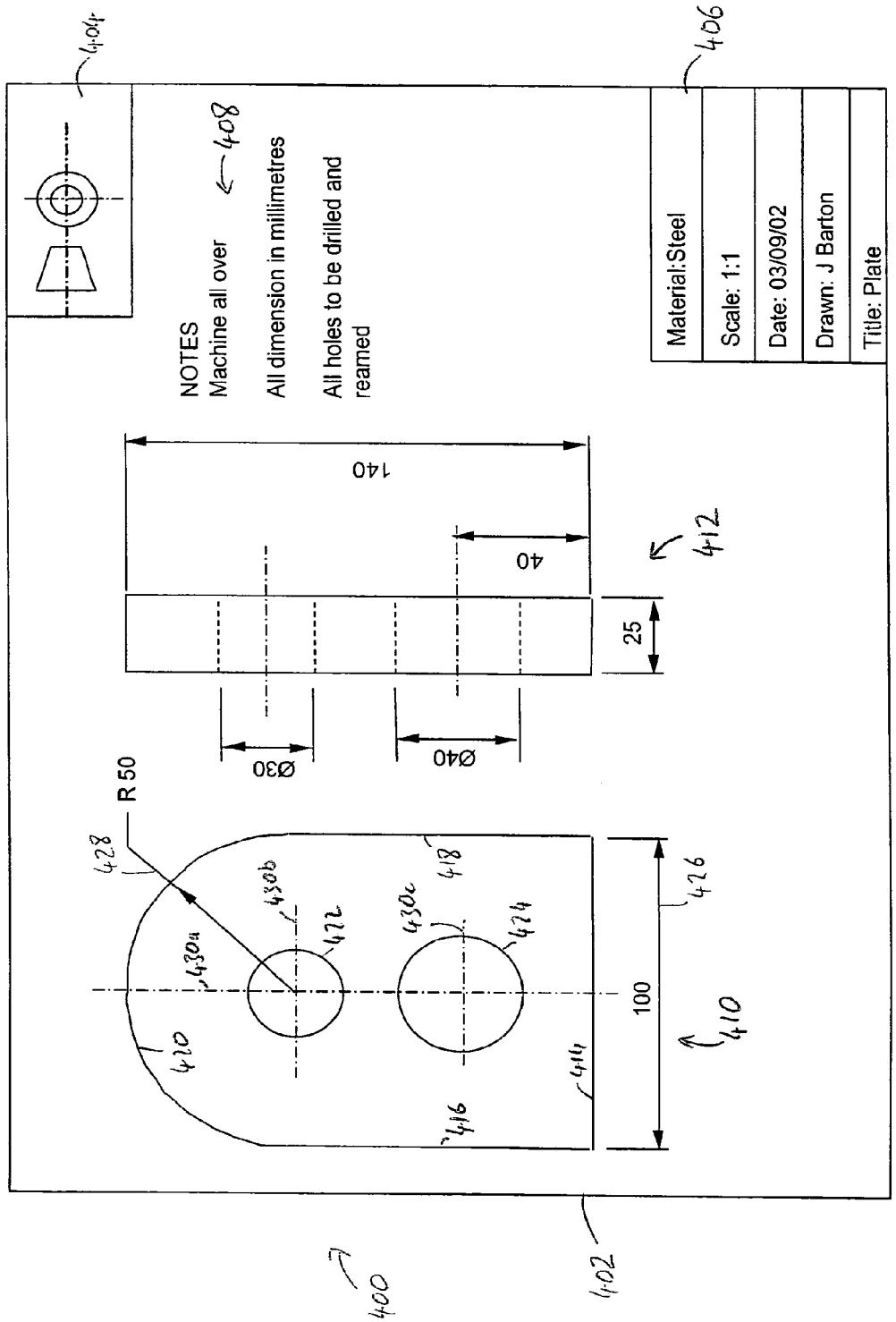
FIG. 9*a* shows an example of a CAD drawing.

FIG. 9*a* shows an example of an engineering drawing produced on a CAD system. CAD drawings are vector based. This means that the drawing file stored on the computer contains information about the graphic entities which make up the drawing, such as lines, circles, arcs etc., in terms of the vector properties, such as x, y co-ordinates, length, radius etc. This contrasts-with bitmap or pixel based image files which are made up of data about the colour (e.g. hue and intensity) of each pixel of the drawing area. For engineering drawings, vector based files can be stored and processed much more efficiently than bitmap or pixel-based files. Therefore an efficient search and retrieval system should also be based on the vector properties.

Also, as shown in FIG. 9*a,* an engineering drawing will often comprise a plurality of views 410, 412, of a component. To find a similar component the search should consider each of the views depicted separately. Therefore information about the drawing should contain separate information about each view.

Figure 2:
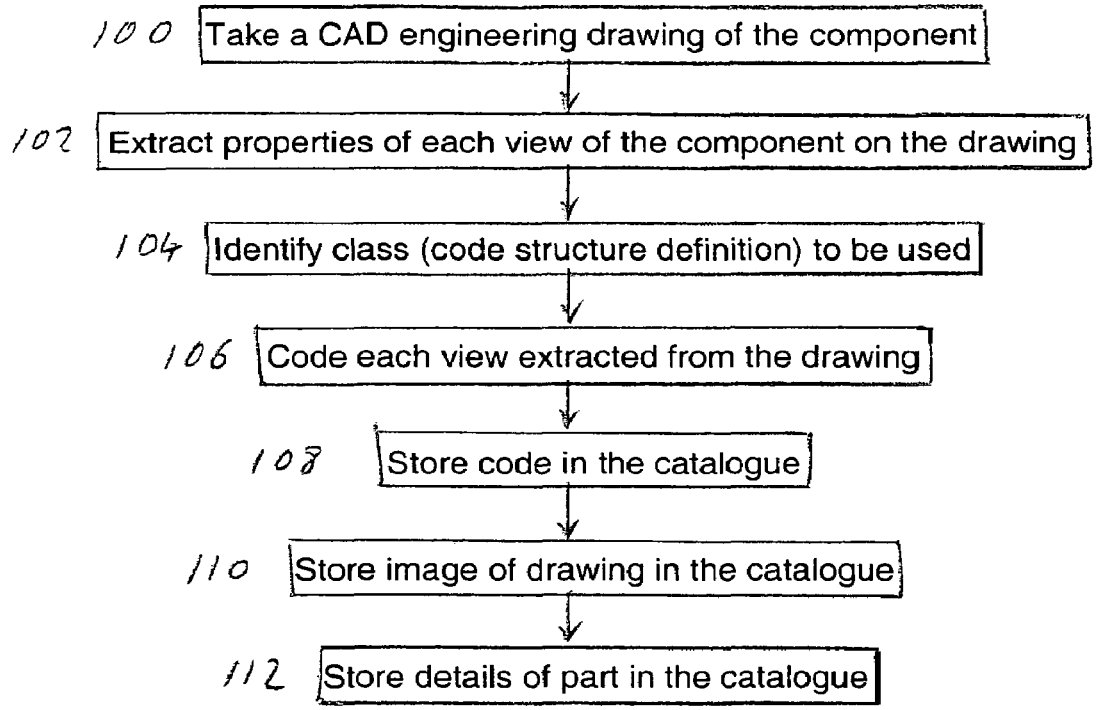
FIG. 2 is a flow diagram showing the principal method steps of a process of an embodiment according to the first aspect.

Referring to FIG. 2, a method of coding a CAD drawing commences at step 101 with a user entering a drawing, the drawing having at least one view. Each view comprises one or more entities, each entity being definable by associated properties which include vector properties of the entity. For each view, at step 102 the properties of each entity in the view are extracted. At step 104 a determination is made of a code structure which is to be used to assign code bits to the properties of each entity. The code structure may be different for different classes of drawing. For example one class of drawing may be electrical circuit diagrams, which would have a different code structure to, say, engineering component drawings. The code structure may be different for different types of property (e.g. different code structures for line lengths and radii of circles). At step 106 the code is assigned. The codes assigned to each of the properties of the entities which make up the view together make up a view code for the view.

At step 108 the view code is stored in a catalogue, the catalogue being a portion of the database defined by the user. Typically the catalogue is a portion of the database containing drawings of components of a common type. At step 110, the image of the drawing is stored in the catalogue. At step 112, the details of a part or component depicted by the drawing, and other information relating to the drawing is stored in the catalogue.

Figure 3:
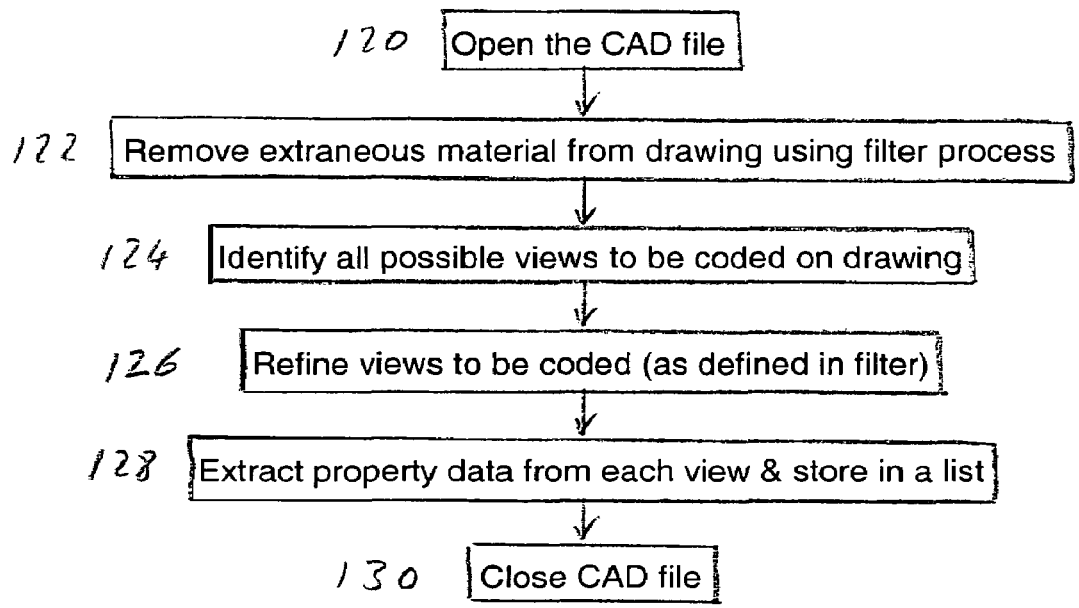
FIG. 3 is a flow diagram showing the method steps used in a process for extracting view properties, forming part of the process of the embodiment of FIG. 2.

Step 102 of FIG. 2 comprises the process of extracting the properties of each view, which process is shown in FIG. 3. At step 120 the CAD file of the drawing is opened. At step 122 extraneous material is removed from the drawing. Examples of extraneous material include the drawing border, title block, labels and dimensions. At step 124 the views which make up the drawing are identified. At step 126 the views are further refined before coding. At step 128 the vector property data for the entities of each view are extracted and stored in a list. At step 130 the CAD file is closed.

Figure 4:
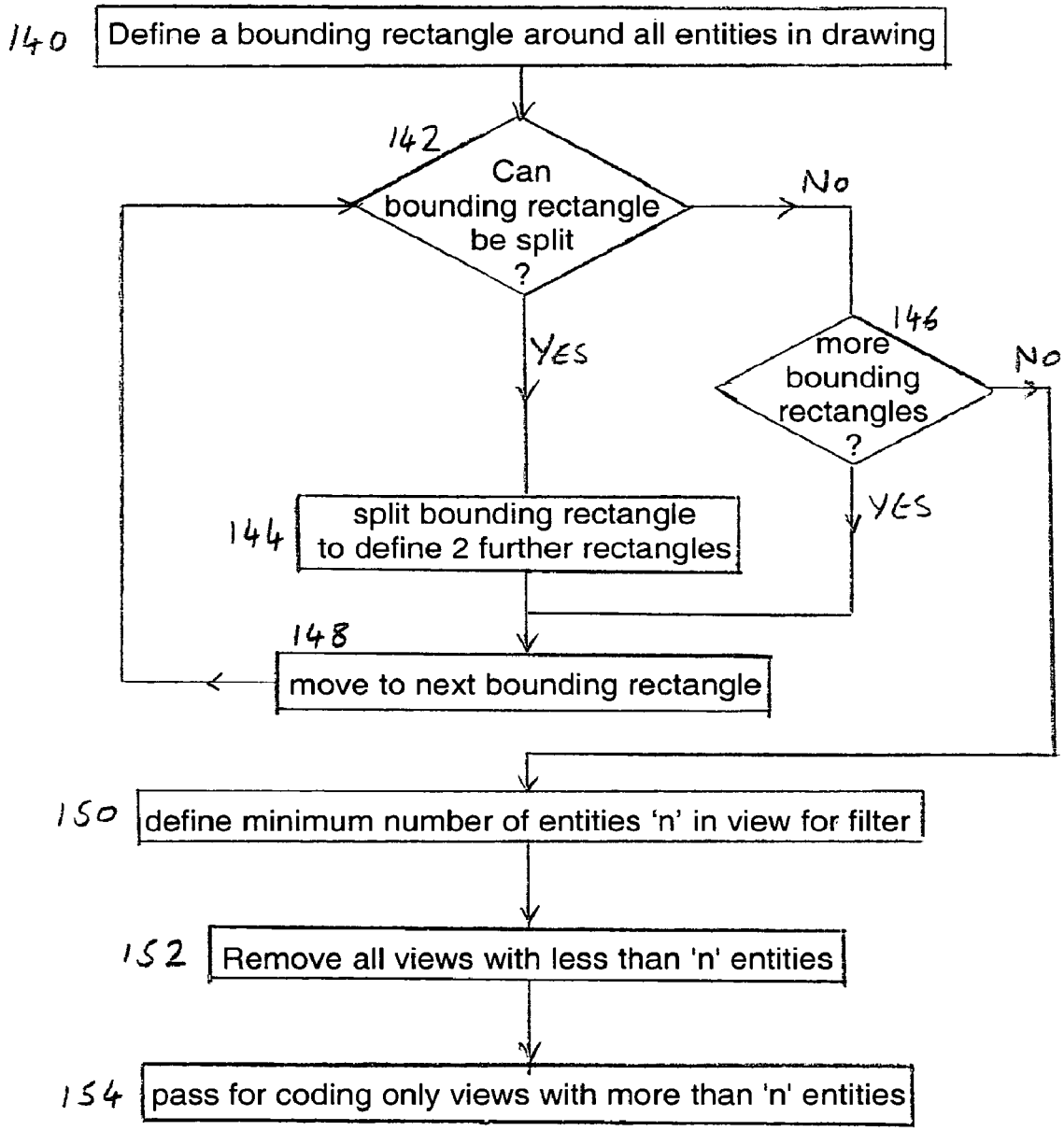
FIG. 4 is a flow diagram showing the method steps used in a process for identifying views, forming part of the method of FIG. 3.

Steps 124 and 126 of FIG. 3 comprise the process of identifying and refining the views to be coded, which process is shown in FIG. 4. At step 140 a bounding rectangle is defined around all the entities in the drawing. At step 142 a test is made as to whether the bounding rectangle can be split to define, at step 144, two rectangles, each bounding a different view. The splitting of the bounding rectangle at step 144 requires that each bounding rectangle encloses one or more entities, but does not intersect an entity. If the bounding rectangle cannot be split, then at step 146 a determination is made as to whether there are any more bounding rectangles for which the test at step 142 has not already been made. This determination is made with regard to all bounding rectangles, including any which have been defined as a result of a split made at step 144. The process continues by moving on to the next bounding rectangle at step 148, until there are no more bounding rectangles which can be split.

An example of the process of refining the views is shown at steps 150, 152 and 154. In the example shown a simple filter is used to remove all views having less than a predetermined number "n" of entities, defined by the user at step 150.

Figure 5:
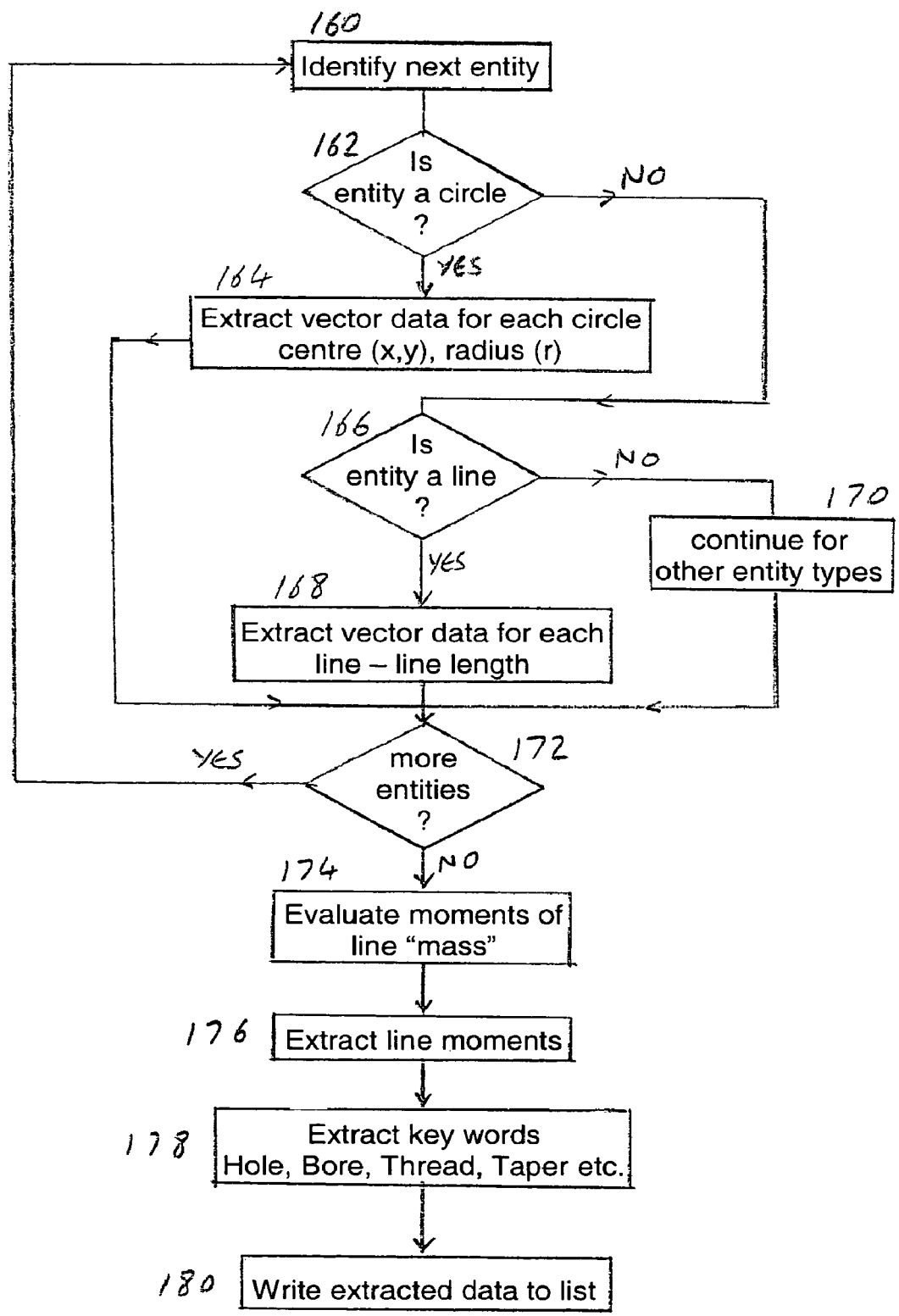
FIG. 5 is a flow diagram showing the method steps used in a process for extracting property data, forming part of the process of FIG. 3.

FIG. 5 shows sub-steps which together make up the step of extracting the properties of each entity (step 128 of FIG. 3). At step 160 a type is identified for each entity from a predefined plurality of entity types. Each type has associated vector data items. The type and vector data items together provide a definition of the entity. At step 162 a determination is made whether the entity is the first of the plurality of types (in this example, a circle). If it is, then at step 164 the circle vector data items, which include the x and y coordinates of the centre of the circle and its radius, are extracted. If the entity is not a circle, then the process steps forward to step 166 where the next entity type (line) is considered. If the entity is a line, then line vector data items are extracted at step 168. If it is not a line, the process steps forward to step 170 where the same procedure is followed for the other entity types in the plurality. At step 172, if there are more entities to consider the process loops back to step 160. If there are no more entities the process steps forward to step 174.

In the process described above with reference to FIG. 5, the vector data comprises relatively simple data (such as x and y co-ordinates and radius of a circle) associated with individual entities. However, the method described is not limited to such simple data. A view in a drawing may contain features which are made up of more than one graphic entity. In such cases the method first identifies the feature and then extracts property data related to the feature. For example, a feature could be a group of connected line entities, or all the straight line entities in the view, or a group of circles showing the positions of holes drilled in a plate.

A problem may arise when a view on a drawing can be depicted in more than one orientation. For example if a view is depicted in one drawing, and the same view is depicted in another drawing, but rotated through 90 degrees, then the x and y coordinates of an entity will, in general, be different for each view. This problem may be at least partly overcome by defining a centre of mass of the view and determining the moments of mass of features in the view about orthogonal axes passing through the centre of mass. In this case the line-or arc length of the entity is used to define the "mass" of the entity. As shown at steps 174 and 176 of FIG. 5, the moments of mass of the entities of the view are determined and extracted as data items.

In addition, as shown in step 178, key words used to describe features on the drawing can be extracted as data items, where these key words correspond with words on a predefined key word list. Examples of key words include "hole", "bore", "taper" and "thread".

Finally, at step 180, all the data items extracted are written to a list.

Figure 6:
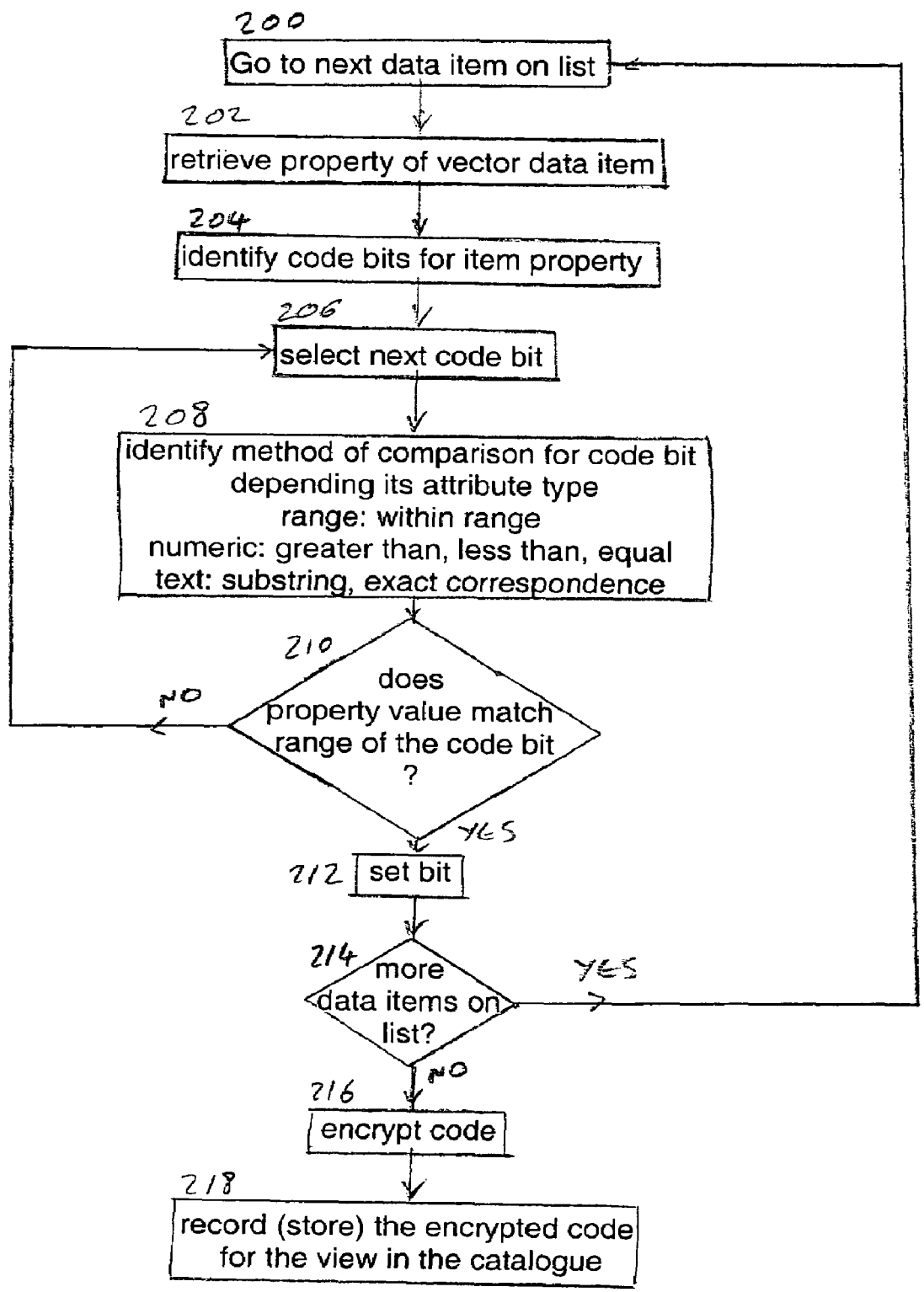
FIG. 6 is flow diagram showing the method steps used in a process for coding a view, forming part of the process of the embodiment of FIG. 2.

Referring to FIG. 6, the process of assigning a code to each data item in the view commences at step 200 by selecting a data item on the list. As described above in relation to FIG. 5, each data item is associated with an entity of a certain type. Thus each data item has a property. For example, a circle may be defined by three vector data items: radius and x and y coordinates of the centre. Thus one data item has the property "radius of a circle", another has the property "x coordinate of centre of a circle" and another "y coordinate of centre of a circle". At step 202, the property of the data item is retrieved so that at step 204 an associated set of code bits is identified for coding the data item.

At step 206 the next code bit of the associated set is selected. Each code bit has an attribute. The attribute defines a predetermined sub-set of data which corresponds to the code bit. Also, at step 208 a method is determined for use in comparing the vector data item with the predetermined sub-set, to determine whether there is a match. For example, for one code bit, the sub-set may be a range of numerical values, the method of comparison being simply to determine whether the value of the vector data item falls within the range; for another code bit, the sub-set may be values above a threshold, the comparison method being to determine whether the vector data item has a value greater than the threshold. The comparison is not limited to numerical values. For example, if the code bit attribute relates to text, the sub-set may be a predetermined text term, the comparison method requiring exact correspondence of the text.

The comparison is made at step 210. If there is no match, then the process loops back to step 206 to select the next code bit. If there is a match, then at step 212 the code bit is set. This means that the code bit is added to the view code.

Where the comparison involves a numerical range, then the upper and lower limits of a range of values that correspond to a given code bit must have been preset. These range limits may be set manually beforehand by a user from knowledge of the likely range of values. Another way of setting the range limits is described as follows.

Data ranges are required for a vector property of a graphic entity that may be found in a set of drawings (stored as a catalogue of drawings of related components in the database). A sample of views from the set of drawings is selected for this purpose. The sample may be as large as needed to obtain a reliable set of data ranges for the type of components in the catalogue. For each view in the sample of views a graphic entity of the type having the vector property for which the range is to be determined is first identified. The vector property of the graphic entity is then extracted from the CAD drawing. This process is repeated for other entities and all the views in the sample. A minimum and a maximum value of the extracted vector properties are determined. Data ranges can then be assigned using any appropriate arithmetical or statistically based division from the determined minimum and maximum values. For example the data ranges may be assigned to achieve an even distribution of the population of vector property values in each range. Note that it is not necessary for all the data ranges to all fall between the maximum and minimum determined values—especially if it is known or expected that values above or below the determined maximum and minimum could occur in practice.

At step 214, if there are more data items to be coded, the method loops back to step 200. If there are no more data items to be coded, then the view code is complete. At step 216 the view code is encrypted and at step 218 the encrypted view code is stored in the catalogue in the database.

Figure 7:
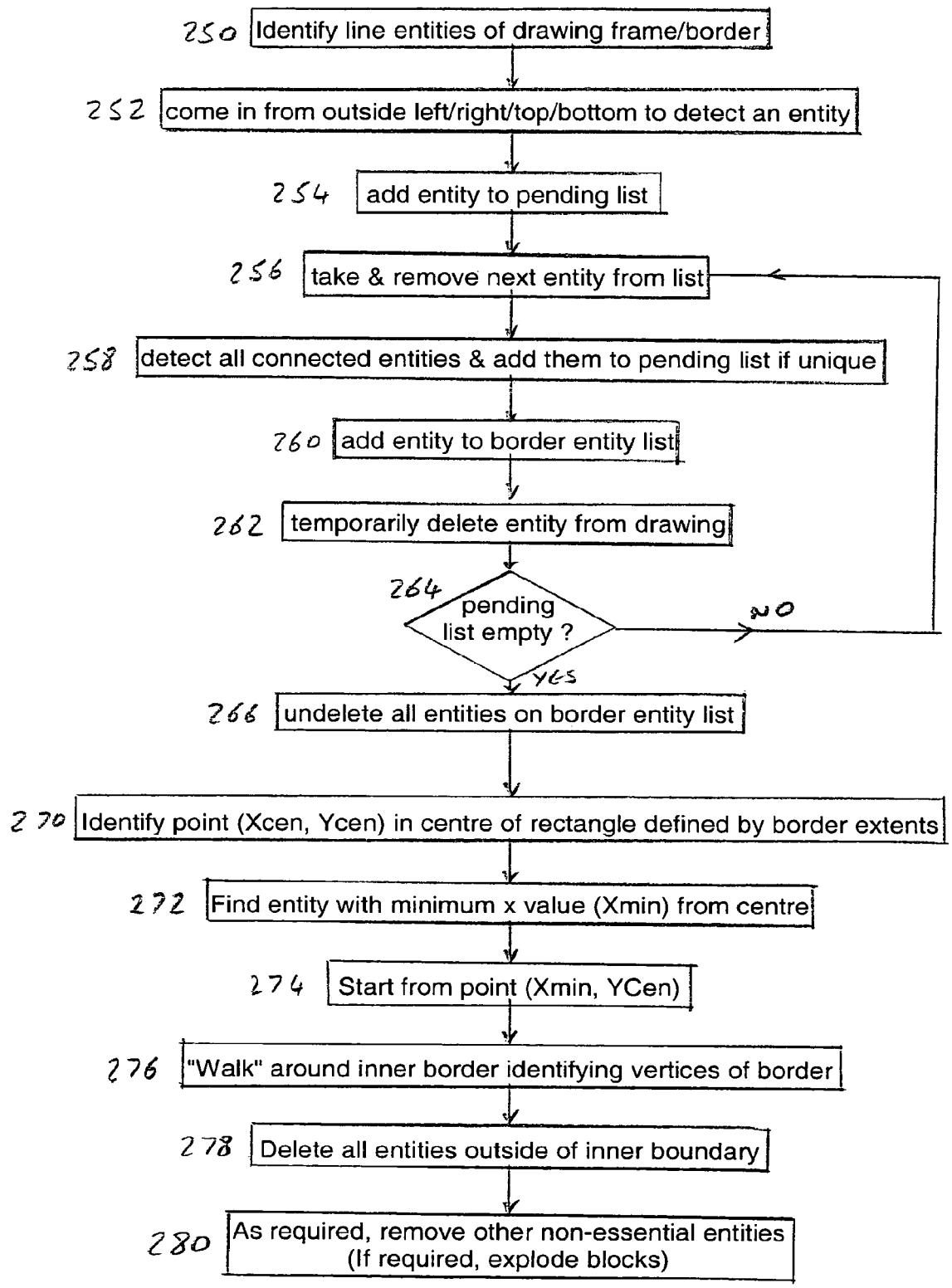
FIG. 7 is a flow diagram showing the method steps used in a process for removing extraneous material from a drawing, forming part of the process of FIG. 3.

FIG. 7 shows the sub-steps which together make up the step of removing extraneous material from the drawing using a filter process (step 122 of FIG. 3). At step 250 a process for identifying the line entities of the drawing frame or border commences. At step 252 an entity of the border is detected by coming in from one of the edge extremities of the drawing (left, right, top or bottom) until an entity is detected. At step 254 the entity is added to a pending list (at this stage this is the only entity on the pending list). At step 256 the next (i.e. at this stage the only) entity on the pending list is taken and removed from the list. All entities connected to this removed entity are detected and added to the pending list at step 258, provided that the connected entity is unique (i.e. is not already on, or has not already been on, the pending list). At step 260 this removed entity is added to a border entity list and, at step 262 is temporarily deleted from the drawing. If at step 264 there are still entities on the pending list, then the process loops back to step 256. If at step 264 there are no further entities on the pending list, then the process steps forward to step 266.

At step 266 all entities on the border entity list are undeleted (i.e. reinstated) on the drawing. At steps 270 to 276 the inner boundary of the border line entities is determined. This assumes that border line entities are orthogonal lines. At step 270, the central point (having coordinates Xcen, Ycen) of the rectangle defined by the border's maximum x and y extents is determined. At step 272 the entity having the lowest x coordinate value (Xmin) is selected. This is the entity closest to the centre in the x-direction. At step 274, a starting point is defined at the point having coordinates (Xmin, Ycen). At step 276 the vertices of the inner boundary are determined by "walking" around the connected entities on the border entity list. At step 278 all entities outside the inner boundary are deleted.

Finally at step 280 other non-essential entities are removed from the drawing. These may include dimensions, machining marks, lines of prescribed type or name, layers of prescribed name, lines with prescribed line colour name, text with prescribed line colour name, and blocks. In the case of blocks, such as title blocks, it may be necessary to "explode" the block first to split it into identifiable entities.

Figure 8:
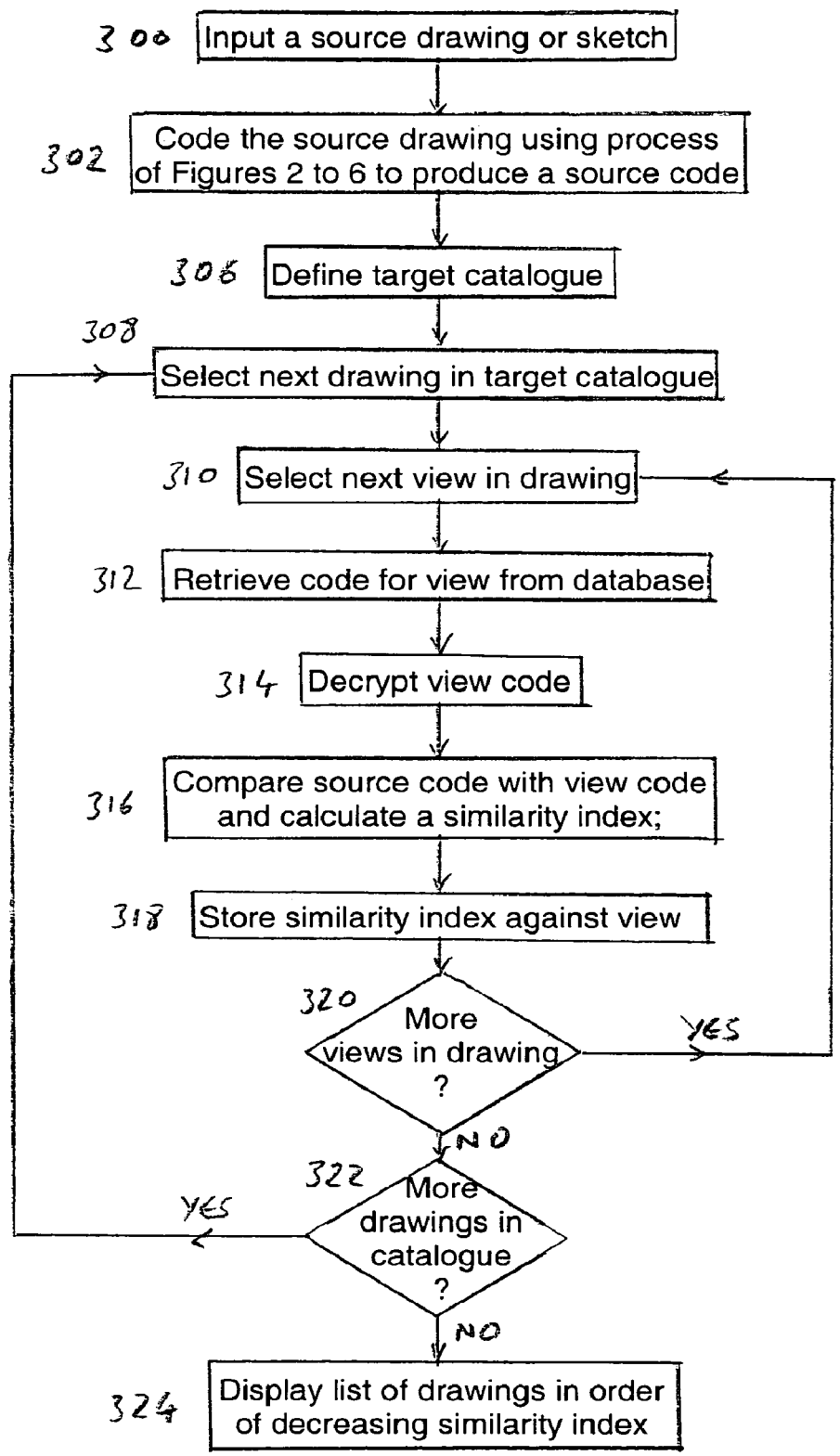
FIG. 8 is a flow diagram showing the method steps of an embodiment according to the second aspect.

Referring to FIG. 8, a method of selecting a CAD drawing for retrieval from a database commences at step 300 with the input of a drawing or sketch to be used as a source view. The method is configured to compare the source drawing with views in drawings stored in the database and to determine a list of drawings containing views in order of their similarity to the source view.

At step 302 the source view is coded using the method described above with reference to FIGS. 2 to 6. At step 306 the user defines a target catalogue of the database for the comparison. This is to allow the user to restrict the field of the search. At step 308 the next drawing in the target catalogue is selected, and at step 310 the next view in the selected drawing is selected. The view code for the selected view is retrieved from the database at step 312, and at step 314 the retrieved view code is decrypted.

At step 316 the codes of the source view and selected view are compared to derive a similarity index. Any of a variety of known algorithms may be used to derive the similarity index. One example is the CAMAC system described in "Computerised component coding and the design of cellular manufacturing systems" by D M Love and A L Love, Proc. Int. Conf. Computer-Aided Production Eng. Michigan June 88, pp 252-260 At step 318 the similarity index is stored against the selected view.

At step 320, if there are more views in the drawing to be compared, the method loops back to step 310 to select the next view. If there are no more views, then at step 322, if there are more drawings to be compared in the catalogue, the method loops back to step 308 to select the next drawing.

Once all the views in all the drawings have been compared, at step 324 a list of drawings is displayed to the user. The first drawing in the list is the one containing the view with the highest similarity index. The subsequent drawings on the list are presented in order of decreasing similarity index of their views.

The user may then select, for retrieval from the database and display, the drawing which contains the most similar view. The user may also choose to display other drawings in the list. Also, the user may choose to scan down the list, starting with the drawing containing the most similar view, until she/he finds the required drawing.

Referring to FIG. 9a, a CAD drawing of a plate component is shown generally as 400, and has a border 402. The area within the border 402 includes a projection box 404, which in this example indicates that the drawing has a third angle projection, a title box 406 containing information about the drawing and the component, various notes 408 and first 410 and second 412 dimensioned views of the component.

The view 410 is made up of entities which include: lines 414, 416, 418, and arc 420, circles 422, 424, dimensions 426, 428 and prescribed lines 430a, 430b, 430c shown as broken lines.

A first step in the coding of the views 410, 412 in the drawing 400, is to identify key words written on the drawing. In this case the notes 408 contain the key words "drilled" and "reamed" being words that relate to the production process for the component. Similarly, the title box 406 contains the key word "steel" which identifies the component's material. These words are written to a list of data items associated with each drawing view.

In the next step extraneous entities are removed. These include the border 402, projection box 404, title box 406, notes 408, dimensions 426, 428, prescribed lines 430a, 430b, 430c, and the dimensions and prescribed lines associated with the second view 412.

Figure 9B:
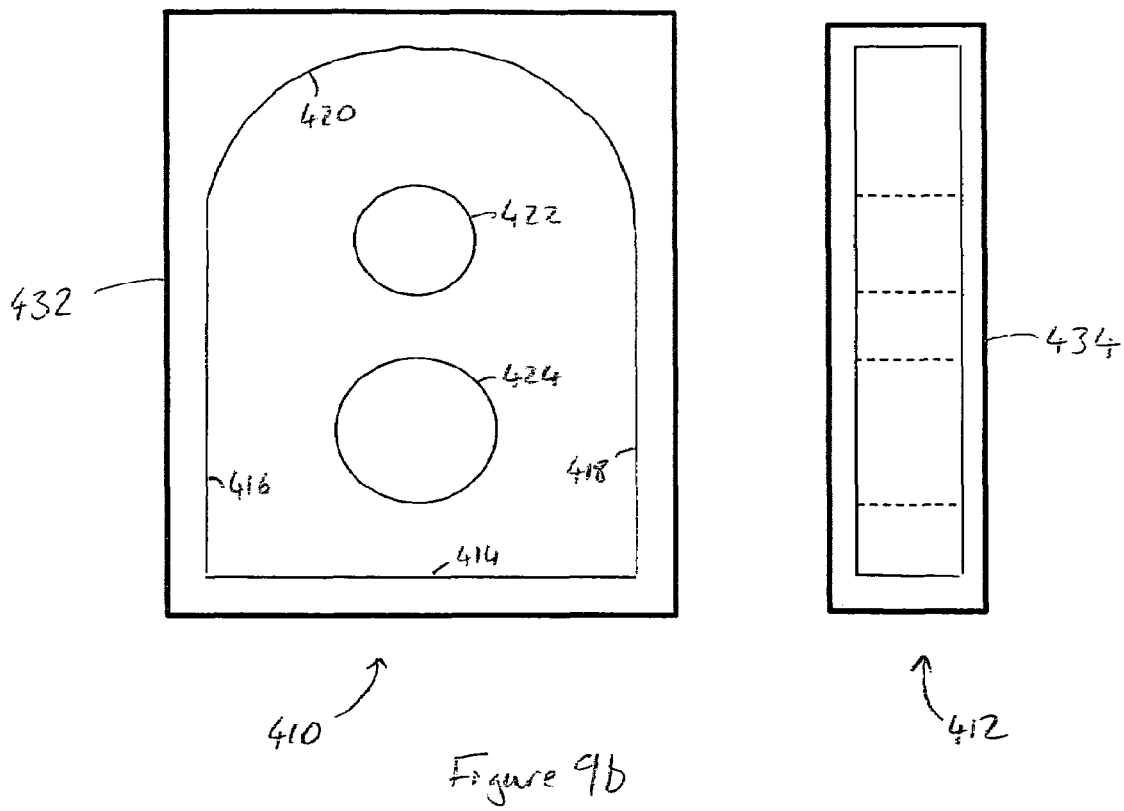
FIG. 9*b* shows two views from the drawing of FIG. 9*a;*

FIG. 9b shows the two views 410, 412 of FIG. 9a after the extraneous entities have been removed. Corresponding reference numerals have been used to refer to equivalent features. Each view 410, 412 has been identified by a bounding rectangle 432, 434. Note that the bounding rectangles 432 434 themselves are not part of the views. That is to say that they are not entities in themselves, but are shown in FIG. 9b for illustrative purposes only. Only two views have been identified as it is not possible to split either of the bounding rectangles 432, 434 to define further views without intersecting an entity.

Figure 10A:
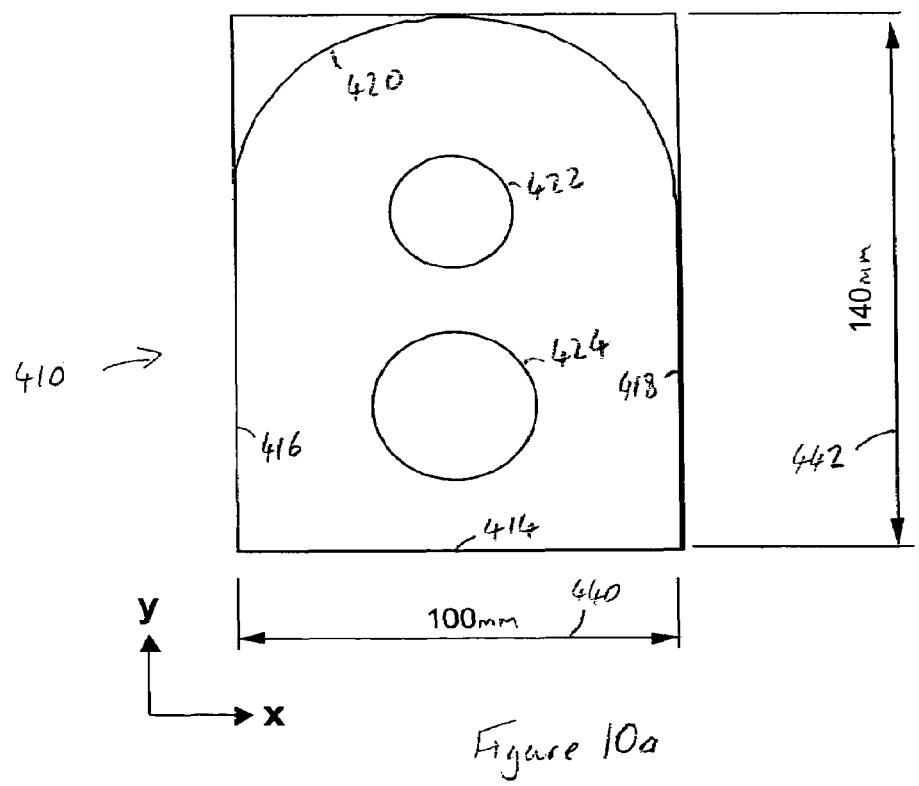
FIGS. 10*a* to 10*c* show one of the views of FIG. 9*b* at different stages of the method according to the embodiment of FIGS. 2 to 7.

FIG. 10a shows a first stage in the extraction of vector data for coding of the first view 410 of FIG. 9. Corresponding reference numerals have been used to refer to equivalent features. The Cartesian directions x and y are defined, the maximum extent of the view in the x direction is determined as 100 mm and in the y direction is determined as 140 mm.

Figure 10B:
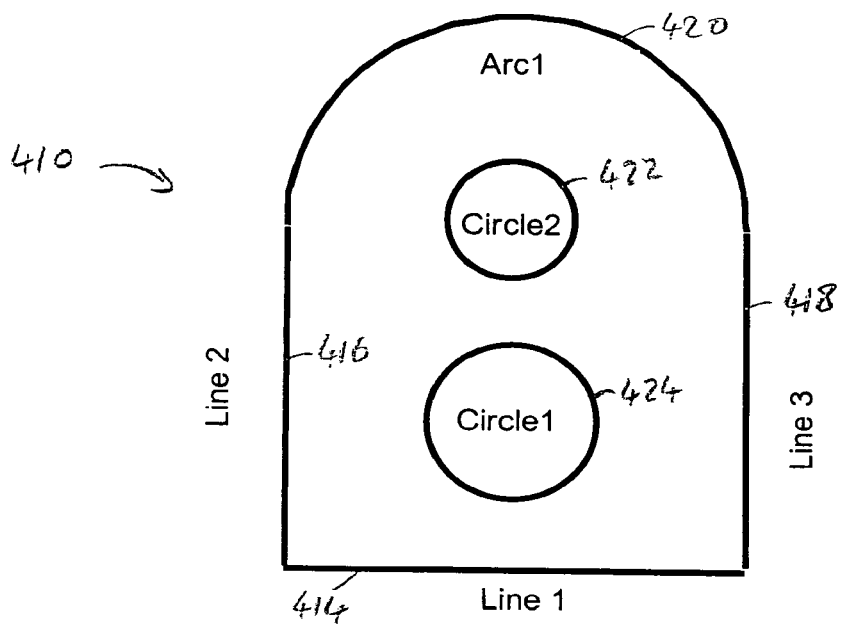
Figure 10C:
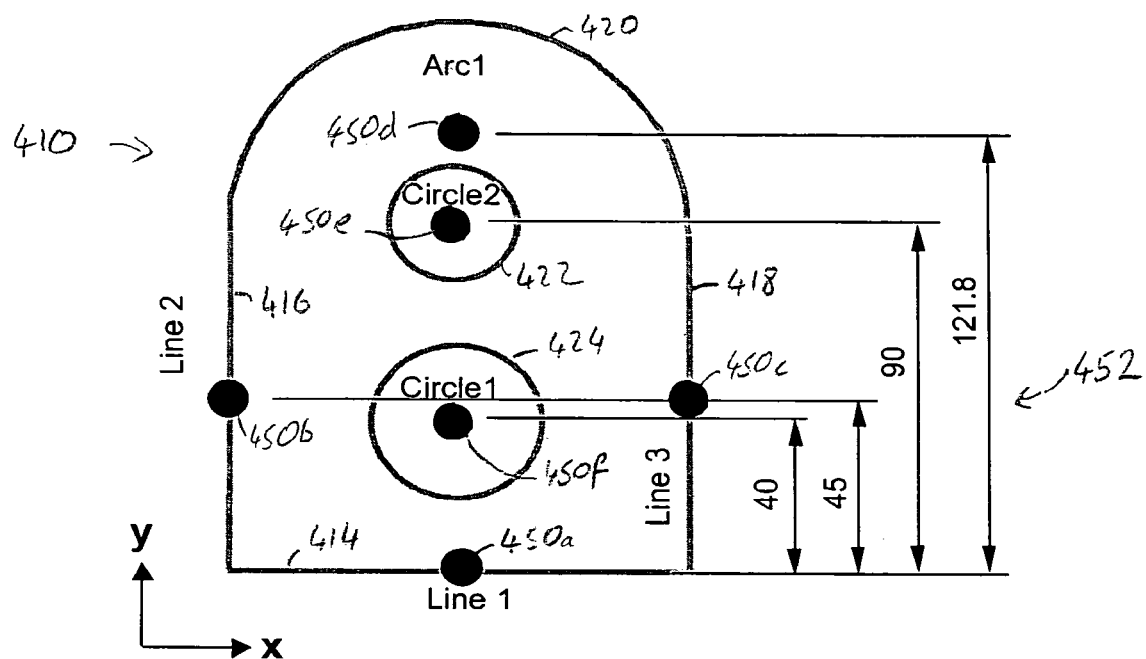

Referring to FIG. 10b, where corresponding reference numerals have been used to refer to equivalent features of FIGS. 9a, 9b and 10a, the entities which make up the first view 410 are identified, together with an entity type and associated vector data. In this case the entities and their vector data are:

Line 1: length=100 mm
Line 2: length=90 mm
Line 3: length=90 mm
Circle 1: radius=20 mm
Circle 2: radius=15 mm
Arc 1: radius=50 mm
Included angle=180 degrees Referring to FIG. 10c, where corresponding reference numerals have been used to refer to equivalent features of FIGS. 9a, 9b, 10a and 10b, the centres of gravity 450a to 450f of each of the entities is identified by their x coordinates (not shown) and y coordinates 452. From this the moments of each of the entities about the X and Y axes are determined thus:

Moment of entity about $X$ axis=length of entity×moment arm

Where the moment arm is the perpendicular distance between the centre of gravity of the entity and the X axis. In this case the moments are:

Moment of line 1 about $X$ axis=100×0=0

Moment of line 2 about $X$ axis=90×45=4050

Moment of line 3 about $X$ axis=90×45=4050

Moment of circle 1 about $X$ axis=125.68×40=4027.2

Moment of circle 2 about $X$ axis=94.26×90=8483.4

Moment of arc 1 about $X$ axis=157.1×127.8=19134.78

Sum of moments about X axis=39745.38

$$\frac{\text{Centre of Gravity of}}{\text{view about X axis}} = \frac{\text{Sum of moments about X axis}}{\text{Total line length}}$$
$$= 39745.38/657.04$$
$$= 60.49 \text{ mm}$$

A similar approach to this calculation yields a Centre of Gravity of the view about the Y axis of 50 mm. This therefore provides a location of the Centre of Gravity for the view at x coordinate 50 and y coordinate 60.49. The position of the centre of gravity of the view relative to the centre of the bounding rectangle is:

$X$ relative position=50−50=0 mm $Y$ relative position=70−60.49=9.51 mm

The centre of gravity data is then coded and encrypted for storage as part of the view code. This results in a view code which is less dependent on the orientation of the view than the use of coordinate vector data identifying an entity's position. The subsequent comparison of view codes will result in a higher similarity index for views for which the only substantial difference is in the orientations of the views.

An example of applying a similarity index will be described with reference to FIG. 11, where three part codes, Part 1 code, Part 2 code, Part 3 code, of three view codes are shown. Each part code comprises a string of bits ('0's or '1's). To compare two codes a similarity index formula is applied, in which each bit of one code is compared with a corresponding bit in the other code.

Formula for similarity index:

$$SimIndex(x, y) = \frac{\text{Match}(x, y)}{(\text{Match}(x, y) + \text{No Match}(x, y))}$$

If a bit in code x is a '1' and the corresponding bit in code y is a '1', then there is a match and Match(x,y) has a value of 1, otherwise Match(x,y) has a value of 0. If the corresponding bits in each code are different then No Match (x,y) has a value of 1, otherwise No Match (x,y) has a value of 0. The Match and No Match values for all the corresponding bits in each code are summed and the formula applied to derive the similarity index for the two codes.

For each of the pairs of part codes shown in FIG. 11:

$$SimIndex(1, 2) = \frac{2}{2+2} = 0.5$$

$$SimIndex(1, 3) = \frac{3}{3+1} = 0.75$$

$$SimIndex(2, 3) = \frac{2}{2+3} = 0.4$$

Thus it can be seen that Part 1 code and Part 3 code have the highest similarity index.

The discussion above has described embodiments of the invention in relation to 2-dimensional drawings. The vast majority of engineering component CAD drawings in existence are 2-dimensional. That is to say that the digital data files in the CAD system define the graphic entities in terms of their 2-dimensional vector properties. However, modern CAD systems increasingly make use of 3-dimensional modelling capabilities. These allow a component to be viewed from different angles and for use of other more complex graphical representations (such as colour shading, light and shadowing effects).

Nevertheless, the methods described above may be applied to a 3-dimensional CAD model. One way of doing this is to derive one or more 2-dimensional views of a component from the 3-dimensional CAD model. This may be done, for example, by producing a 2-dimensional projection of a component in the 3-dimensional model. The 2-dimensional view can then be coded using the same methods described herein, and the code stored for later comparison. This is particularly appropriate for aiding the designer to select a drawing or 3-dimensional model from the database because, when producing the source view (or sketch), the designer need only be concerned with entering a 2-dimensional representation of the component, which can then be coded and used for comparison with the stored 2-dimensional view codes.

Another possibility is to produce a model code directly from the 3-dimensional model, using the information stored in the model data-files. When the designer generates the 3-dimensional model, the model entities (geometrical entities, which may include graphical and other entities) are defined in sufficient detail to enable properties of the entities to be extracted and coded. In this case, when seeking to retrieve a model from the database, the designer inputs a 3-dimensional source model, which is then coded for comparison with stored codes.

We claim:

1. A method of coding a view in a 2-dimensional CAD drawing into a format different from the 2-dimensional CAD drawing, the method comprising:

a) filtering the 2-dimensional CAD drawing to temporarily remove extraneous material therefrom;
b) identifying a view in the 2-dimensional CAD drawing for coding;
c) identifying a feature of the view, wherein the feature comprises a graphic entity or a group of graphic entities in the form of a line or curve;
d) extracting properties of the feature from the 2-dimensional CAD drawing, wherein the properties include vector properties associated with the graphic entity or group of graphic entities and are derived from coordinates relating to the feature's position within the 2-dimensional CAD drawing;
e) generating code bits, wherein the code bits are representative of the extracted vector properties;
f) adding the generated code bits to a view code for the view, wherein the view code is a coded version of the view in a format different from the 2-dimensional CAD drawing; and
g) storing the view code.

2. A method according to claim 1, further including repeating steps c) to g) for further entities and/or groups of entities in the view.

3. A method according to claim 1, wherein the group of graphic entities includes entities having similar properties, entities of a similar type or entities which form the group by virtue of their location or juxtaposition in the view.

4. A method according to claim 1, wherein the step of identifying a view in the 2-dimensional CAD for coding comprises defining a boundary enclosing an area which includes the graphic entities in the 2-dimensional CAD drawing and dividing the area to define a plurality of view areas, such that each view area includes one or more graphic entities, and no graphic entity is included in more than one area.

5. A method according to claim 4, wherein the boundary is a bounding rectangle, the step of dividing the boundary to define a plurality of view areas comprising splitting the bounding rectangle to define a plurality of view rectangles.

6. A method according to claim 4 further including the step of refining the views to be coded by removing all views having less than a predetermined number of entities and passing for coding views having greater than or equal to the predetermined number of entities.

7. A method according to claim 1, wherein the step of extracting the properties comprises identifying a type for each property from a predefined plurality of property types, each property type having associated items of property data, extracting the property data from the 2-dimensional CAD drawing and writing the type and associated property data items to a list.

8. A method according to claim 7, wherein the step of generating code bits includes setting type code bits corresponding to the property type and setting data code bits corresponding to each item of property data.

9. A method according to claim 8, wherein the setting of data code bits includes comparing each property data item with a predetermined sub-set of data associated with a given code bit and setting the given data code bit if the property data item falls within the predetermined sub-set.

10. A method according to claim 9, wherein each code bit has an associated attribute, a method for comparing the property data item with the predetermined sub-set of data associated with the code bit being determined by the attribute.

11. A method according to claim 10, wherein the attribute associated with the code bit is a predetermined attribute selected from a list of attributes which includes range, numeric and text, having respective associated comparison methods of:

"within range" wherein the code bit is set when the property data item has a value that falls within a predetermined range;
"greater than, less than, equal" wherein a different code bit is set according to whether the property data item has a value greater than, less than or equal to a predetermined value; and
"substring" wherein the code bit is set if there is exact correspondence with a predetermined text substring.

12. A method according to claim 1, wherein the view code has a predefined structure of code bits, and the drawing has a predetermined class, the code structure being defined differently for drawings having different classes.

13. A method according to claim 1, wherein the step of storing the view code includes encrypting the view code and storing the encrypted view code.

14. A method according to claim 13, wherein the step of storing comprises storing the encrypted view code in a catalogue, the catalogue being a portion of the database in which a sub-set of drawings is stored.

15. A method according to claim 13, wherein the step of storing includes storing encrypted view codes of all views in the 2-dimensional CAD drawing.

16. A method according to claim 15, further including storing at least one of an image file of the 2-dimensional CAD drawing, details of a part or component depicted by the drawing, and other information relating to the drawing.

17. A method according to claim 1, wherein the step of filtering the 2-dimensional CAD drawing includes temporarily removing a frame/border of the drawing.

18. A method according to claim 17, wherein the frame/border is temporarily removed by identifying line entities which make up the frame/border, identifying an inner boundary of the frame/border line entities, and temporarily deleting all graphic entities outside the inner boundary.

19. A method according to claim 17 or claim 18, wherein the filter process includes temporarily removing other entities including any one or more of: dimensions, machining marks, lines of prescribed type or name or color, drawing layers of prescribed name, text with prescribed color, and blocks.

20. A method of coding a view from a vector-based 3-dimensional CAD model into a format different from the vector-based 3-dimensional CAD model, the method comprising:
a) deriving a 2-dimensional view from the vector-based 3-dimensional CAD model for coding;
b) identifying a feature of the view, wherein the feature comprises a graphic entity or a group of graphic entities in the form of a line or curve;
c) extracting properties of the feature from the vector-based 3-dimensional CAD model, wherein the properties include vector properties associated with the graphic entity or group of graphic entities and are derived from coordinates relating to the feature's position within the drawing;
d) generating code bits, wherein the code bits are representative of the extracted properties;
e) adding the code bits to a view code for the view, wherein the view code is a coded version of the view in a format different from the vector-based 3-dimensional CAD model; and
f) storing the view code.

21. A method according to claim 20, further including repeating steps b) to e) for further entities and/or groups of entities in the view.

22. A method according to claim 20, including repeating steps a) to f) for further views from the 3-dimensional CAD model so as to store a plurality of codes of different views.

23. A method of coding a view in a vector-based CAD drawing into a format different from the vector-based CAD drawing, the method comprising:
   a) identifying a feature of the view in the vector-based CAD drawing, wherein the feature comprises a graphic entity or a group of graphic entities in the form of a line or curve;
   b) extracting properties of the feature from the vector-based CAD drawing, wherein the properties include vector properties associated with the graphic entity or group of graphic entities and are derived from coordinates relating to the feature's position within the drawing;
   c) generating code bits, wherein the code bits are representative of the extracted properties;
   d) adding the generated code bits to a view code for the view, wherein the code is a coded version of the view in a format different from the vector-based CAD drawing; and
   e) storing the view code.

24. A method according to claim 23, further including repeating steps a) to d) for further entities and/or groups of entities in the view.

25. A method according to claim 23, wherein the group of graphic entities includes entities having similar properties, entities of a similar type or entities which form a group by virtue of their location or juxtaposition in the view.

26. A method according to claim 23, wherein the step of extracting the properties comprises identifying a type for each property from a predefined plurality of property types, each property type having associated items of property data, extracting the property data from the CAD drawing and writing the type and associated property data items to a list.

27. A method according to claim 23, wherein the step of generating code bits includes setting type code bits corresponding to the property type and setting data code bits corresponding to each item of property data.

28. A method according to claim 27, wherein the setting of data code bits includes comparing each property data item with a predetermined sub-set of data associated with a given code bit and setting the given data code bit if the property data item falls within the predetermined sub-set.

29. A method according to claim 28, wherein each code bit has an associated attribute, a method for comparing the property data item with the predetermined sub-set of data associated with the code bit being determined by the attribute.

30. A method according to claim 29, wherein the attribute associated with the code bit is a predetermined attribute selected from a list of attributes which includes range, numeric and text, having respective associated comparison methods of:
   "within range" wherein the code bit is set when the property data item has a value that falls within a predetermined range;
   "greater than, less than, equal" wherein a different code bit is set according to whether the property data item has a value greater than, less than or equal to a predetermined value; and
   "substring" wherein the code bit is set if there is exact correspondence with a predetermined text substring.

31. A method according to claim 23, wherein the view code has a predefined structure of code bits, and the drawing has a predetermined class, the code structure being defined differently for drawings having different classes.

32. A method according to claim 23, wherein the step of storing the view code includes encrypting the view code and storing the encrypted view code.

33. A method according to claim 32, wherein the step of storing comprises storing the encrypted view code in a catalogue, the catalogue being a portion of the database in which a sub-set of drawings is stored.

34. A method according to claim 32, wherein the step of storing includes storing encrypted view codes of all views in a drawing.

35. A method according to claim 34, further including storing at least one of an image file of the drawing, details of a part or component depicted by the drawing, and other information relating to the drawing.

36. A method according to claim 23 including, prior to extracting the vector properties, a filter process for temporarily removing extraneous material from the drawing.

37. A method according to claim 36, wherein the filter process includes temporarily removing a frame/border of the drawing.

38. A method according to claim 37, wherein the frame/border is temporarily removed by identifying line entities which make up the frame/border, identifying an inner boundary of the frame/border line entities, and temporarily deleting all graphic entities outside the inner boundary.

39. A method according to claim 37, wherein the filter process includes temporarily removing other entities including any one or more of: dimensions, machining marks, lines of prescribed type or name or color, drawing layers of prescribed name, text with prescribed color, and blocks.

40. A method of selecting a CAD drawing for retrieval from a database of drawings, the method comprising:
   a) producing a CAD source drawing comprising a source view;
   b) identifying a feature of the source view, wherein the feature comprises a graphic entity or a group of graphic entities in the form of a line or curve;
   c) extracting properties of the feature from the CAD source drawing, wherein the properties include vector properties associated with the graphic entity or group of graphic entities and are derived from coordinates relating to the feature's position within the drawing;
   d) generating code bits, wherein the code bits are representative of the extracted properties;
   e) adding the code bits to a source view code for the source view, wherein the source view code is a coded version of the source view in a different format from the source view;
   f) comparing the source view code with each of a plurality of stored view codes and calculating a similarity index for each stored view code of the plurality; and
   g) selecting the drawing for retrieval from the database on the basis of the similarity index.

41. A method according to claim 40, wherein the step of selecting comprises identifying a most similar view of the plurality of views, the most similar view having the highest similarity index, and selecting the drawing which contains the most similar view.

42. A method according to claim 40, wherein the step of selecting includes the step of displaying a list of drawings for user selection of the drawing, the list being ordered according to the similarity indices of views in the drawings.

43. A method according to claim 40, wherein the plurality of stored view codes comprises the view codes of views contained in drawings stored in a catalogue, the catalogue being a portion of the database.

44. A method for determining data ranges of a vector property of a graphic entity in a set of drawings, the method comprising:
   a) determining a sample of views from said set of drawings;
   b) selecting a view from said sample of views;

c) identifying said graphic entity in said view in the form of a line or curve;
d) extracting said vector property of said graphic entity in said selected view wherein the property is derived from coordinates relating to the feature's position within the drawing;
e) repeating steps b) to d) for the other views in the sample of views;
f) determining a minimum and a maximum value of said extracted vector properties; and
g) assigning data ranges to said vector properties on the basis of said maximum and minimum values.

45. A method according to claim 44 wherein the data ranges are assigned to achieve an even distribution of the population of vector property values in each range.

46. A method of producing a model code directly from a 3-dimensional CAD model in a format different from the 3-dimensional CAD model, the method comprising:
a) identifying a feature in the 3-dimensional CAD model comprising a geometrical entity or a group of geometrical entities;
b) extracting properties of the feature from the CAD model, wherein the properties include vector properties associated with the geometrical entity or group of geometrical entities, the vector properties derived from coordinates relating to the feature's position within the model;
c) generating code bits, wherein the code bits are representative of the extracted properties;
d) adding the generated code bits to a model code for the model; and
e) storing the model code.

47. A method according to claim 1 wherein the line or curve comprises a straight line, arc or circle.

48. A method according to claim 1 wherein the vector properties include coordinate data for specifying the location of a feature.

49. A method according to claim 1 wherein the vector properties include coordinate data defining the geometry of a feature, such as line length, orientation, radius.

50. A drawing retrieval system for a 2-dimensional CAD system comprising an input device and a display, and a memory for storing data including a database of drawings, the drawing retrieval system comprising:
a) an identifier configured to identify a feature of a view in a 2-dimensional CAD drawings, wherein the feature comprises a graphic entity or a group of graphic entities in the form of a line or curve;
b) an extractor configured to extract properties of the feature, wherein the properties include vector properties associated with the entity or group of entities and are derived from coordinates relating to the feature's position within the drawing;
c) a coder configured to generate code bits and to add the code bits to a view code for the view, wherein the code bits are representative of the extracted properties;
d) the system configured to store the view code in the memory;
e) the system configured to compare (i) a first view code of a first view in a first drawing entered in the input device with (ii) a second view code of a second view a second drawing in the database, to derive a similarity index indicative of a degree of similarity between the first view and the second view; and
f) the system configured to present on the display, on the basis of the similarity index, a list of drawings from which a user can select for retrieval from the database means for retrieving a selected drawing from the database.

51. A computer readable medium encoded with software comprising computer readable instructions for controlling a computer to code a view in a CAD drawing, including instructions for coding a view in a 2-Dimensional CAD drawings into a format different from the 2-Dimensional CAD drawing by:
a) filtering said 2-dimensional CAD drawing to temporarily remove extraneous material therefrom;
b) identifying a view within the 2-Dimemensional CAD drawing for coding;
c) identifying a feature of the identified view, wherein the feature comprises a graphic entity or a group of graphic entities in the form of a line or curve,
d) extracting properties of the feature from the 2-Dimensional CAD drawing, wherein the properties are vector properties associated with the graphic entity or group of graphic entities and derived from coordinates relating to the feature's position within the drawing;
e) generating code bits, wherein the code bits are representative of the extracted vector properties;
f) adding the generated code bits to a view code for the view, wherein the view code is a coded version of the view in a format different from the 2-Dimensional CAD drawing; and
g) storing the view code.

52. A computer readable medium encoded with software comprising computer readable instructions for controlling a computer to facilitate selection by a user of a CAD drawing for retrieval from a database of CAD drawings, each CAD drawing in the database comprising at least one view that has been coded by:
a) identifying a view within the CAD drawing for coding;
b) identifying a feature of the identified view, wherein the feature comprises a graphic entity or a group of graphic entitles in the form of a line or curve;
c) extracting properties of the feature from the CAD drawing, wherein the properties are vector properties associated with the graphic entity or group of graphic entities and derived from co-ordinates relating to the feature's position within the drawing;
d) generating code bits, wherein the code bits are representative of the extracted vector properties;
e) adding the generated code bits to a view code for the view; wherein the view code is a coded version of the view in a format different from the CAD drawing,
wherein the computer readable instructions include instructions for:
i) producing a CAD source drawing comprising a source view;
ii) coding the source view in accordance with steps a) to e) above;
iii) comparing the source view code with each of a plurality of stored codes of views in the database of drawings to calculate a similarity index for each stored view code; and
iv) on the basis of the similarity index, presenting a list of drawings from which the user can select for retrieval from the database.

* * * * *